(12) United States Patent
Bokari et al.

(10) Patent No.: US 9,479,709 B2
(45) Date of Patent: Oct. 25, 2016

(54) METHOD AND APPARATUS FOR LONG TERM IMAGE EXPOSURE WITH IMAGE STABILIZATION ON A MOBILE DEVICE

(71) Applicant: NVIDIA Corporation, Santa Clara, CA (US)

(72) Inventors: Syed Zahir Bokari, Ottawa (CA); Josh Abbott, Raleigh, NC (US); Jim van Welzen, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/051,307

(22) Filed: Oct. 10, 2013

(65) Prior Publication Data

US 2015/0103193 A1     Apr. 16, 2015

(51) Int. Cl.
| | | |
|---|---|---|
| H04N 5/262 | (2006.01) | |
| H04N 5/232 | (2006.01) | |
| H04N 5/272 | (2006.01) | |

(52) U.S. Cl.
CPC ........ H04N 5/2621 (2013.01); H04N 5/23264 (2013.01); H04N 5/23293 (2013.01); H04N 5/272 (2013.01)

(58) Field of Classification Search
CPC ................... H04N 5/23251; H04N 5/23254; H04N 5/23267; H04N 5/35581; H04N 5/2621; H04N 5/23264; H04N 5/23293; G06T 5/003; G06T 7/0044; G06T 19/006; G06T 2207/30244
See application file for complete search history.

(56) References Cited

U.S. PATENT DOCUMENTS

| | | | |
|---|---|---|---|
| 6,134,346 A | 10/2000 | Berman et al. | |
| 6,970,591 B1 | 11/2005 | Lyons et al. | |
| 7,071,948 B2* | 7/2006 | Wilensky | 345/581 |
| 7,418,131 B2 | 8/2008 | Wang et al. | |
| 7,483,062 B2 | 1/2009 | Allman et al. | |
| 8,340,351 B2 | 12/2012 | Adcock | |
| 2005/0129324 A1 | 6/2005 | Lemke | |
| 2005/0259870 A1* | 11/2005 | Kondo et al. | 382/173 |
| 2008/0170124 A1* | 7/2008 | Hatanaka et al. | 348/208.4 |
| 2008/0316327 A1* | 12/2008 | Steinberg et al. | 348/222.1 |
| 2009/0179995 A1* | 7/2009 | Fukumoto et al. | 348/208.6 |
| 2010/0231721 A1* | 9/2010 | Meloche et al. | 348/159 |
| 2010/0232668 A1 | 9/2010 | Schobinger et al. | |
| 2011/0096179 A1* | 4/2011 | Border et al. | 348/208.4 |
| 2011/0164810 A1 | 7/2011 | Zang et al. | |

(Continued)

FOREIGN PATENT DOCUMENTS

| | | |
|---|---|---|
| GB | 2503563 | 1/2014 |
| GB | 2506338 | 4/2014 |

(Continued)

*Primary Examiner* — Aung S Moe (57) ABSTRACT

A method for displaying a live preview image on a mobile device is disclosed. The method includes computing a history color value and confidence value for each pixel of a sensor of a camera. Further, it includes obtaining a new frame of pixels from the camera. Subsequently, for each pixel in the new frame, the method includes: (a) determining if a pixel color is similar to a corresponding history color value and if a confidence corresponding to a pixel is above a predetermined threshold; (b) if the pixel color is not similar to the history color value and the confidence is above the predetermined threshold, displaying the history color value on the preview when displaying the new frame; and (c) if the pixel color is similar to the history color value or the confidence is below the threshold, displaying the pixel color on the preview instead.

20 Claims, 8 Drawing Sheets

(56) References Cited

U.S. PATENT DOCUMENTS

| | | | |
|---|---|---|---|
| 2011/0205381 A1* | 8/2011 | Vranceanu et al. | 348/217.1 |
| 2012/0320237 A1 | 12/2012 | Liu et al. | |
| 2013/0071028 A1* | 3/2013 | Schiller et al. | 382/180 |
| 2014/0010472 A1* | 1/2014 | Xu | 382/263 |
| 2014/0028714 A1* | 1/2014 | Keating et al. | 345/633 |
| 2014/0270487 A1* | 9/2014 | Park | 382/155 |
| 2014/0285619 A1 | 9/2014 | Acquavella et al. | |
| 2014/0294361 A1* | 10/2014 | Acharya et al. | 386/241 |
| 2014/0320593 A1 | 10/2014 | Pirchheim et al. | |
| 2015/0084951 A1 | 3/2015 | Boivin et al. | |
| 2015/0103183 A1* | 4/2015 | Abbott et al. | 348/169 |
| 2015/0209673 A1 | 7/2015 | Martini | |

FOREIGN PATENT DOCUMENTS

| | | |
|---|---|---|
| WO | 2013167901 | 11/2013 |
| WO | 2014020317 | 2/2014 |
| WO | 2014162228 | 3/2014 |

* cited by examiner

FIG. 5 c = confidence level
h = history frame pixel color
f = new frame pixel color
H = updated history pixel color

| | Confident (c > 0.4) | Not Confident (0.2 < c < 0.4) |
|---|---|---|
| Similar (similarity == 1.0) | c += 0.01<br>H = h×0.9 + f×0.1 | c += 0.01<br>H = h×0.5 + f×0.5 |
| Not Similar (similarity == 0.0) | c −= 0.007<br>H = h | c −= 0.007<br>H = h×0.4 + f×0.6 |

METHOD AND APPARATUS FOR LONG TERM IMAGE EXPOSURE WITH IMAGE STABILIZATION ON A MOBILE DEVICE

CROSS-REFERENCE TO RELATED APPLICATIONS

The present application is related to U.S. patent application Ser. No. 14/051,282, filed Oct. 10, 2013, entitled "A METHOD AND APPARATUS FOR DEVICE ORIENTATION TRACKING USING A VISUAL GYROSCOPE," naming Josh Abbott, Jared Heinly and Jim van Welzen as inventors. That application is incorporated herein by reference in its entirety and for all purposes.

FIELD OF THE INVENTION

Embodiments according to the present invention generally relate to electronic devices, e.g., portable electronic devices, and more specifically to methods for capturing images using portable electronic devices.

BACKGROUND OF THE INVENTION

While cameras fitted on portable electronic devices, e.g., tablets, phones, etc. have made significant advancements in the number of features they offer in recent years, a common problem with the cameras is that they do not provide any mechanism whereby a user can filter out undesirable objects that may unexpectedly appear in the field of view of the camera. Further, they do not provide any mechanism for filtering out undesirable objects in the live preview window when capturing the image. For example, a user may want to take a photograph of a historic building with a high amount of foot traffic in the foreground. In conventional mobile devices, the user may not have an option to view a live preview of the attraction or capture an image of the attraction without the unwanted crowds. Additionally, conventional cameras do not allow users to exclude certain moving objects, via selection, from the removal effect.

BRIEF SUMMARY OF THE INVENTION

Accordingly, a need exists for a system and a method that can perform foreground or background subtraction on a live preview image captured by a camera on a mobile device by allowing users to filter out undesirable elements that may unexpectedly appear for a short period of time in the field of view of the camera.

One reason conventional cameras do not offer such a feature is because it requires the camera on the mobile device to be able to perform long-exposure photography (or time-exposure photography) so that the stationary elements of images can be sharply captured. Conventional cameras do not typically, however, have a robust mechanism of stabilizing the jitter that can occur in a handheld device as a result of a photographer's unstable hand.

Embodiments of the present invention can use relatively long exposure times to build up a history for the image and maintain the history as a best approximation of the background. Subsequently, embodiments of the present invention can use the history data to infill the image where unexpected foreground or background objects appear in the image. Stated differently, embodiments of the present invention maintain a history of an image as the camera is previewing the image and use the history data to minimize interference from unexpected objects recently or temporarily appearing in the field of view of the camera. Embodiments of the present invention minimize interference by removing, for example, moving objects in a scene displayed in the live preview window when capturing an image via a camera application while keeping the static objects. In one embodiment, the present invention also allows users to exclude certain moving objects via selection from the removal effect.

Further, embodiments of the present invention use a visual gyroscope for performing image stabilization. The visual gyroscope can, for example, use a vision-based tracking procedure that uses the camera on the mobile device to determine orientation by identifying and tracking landmarks (or image features) in natural environment. Using the orientation and tracked features, the visual gyroscope can enable embodiments of the present invention to account for jitter by performing a best fit and creating a stable, long-exposure image.

Certain conventional camera applications may allow the user to remove unwanted objects in an image after the image has been captured. It should be noted, however, that embodiments of the present invention allow image effects to take place in the live preview window. For example, the undesirable objects would be filtered out in real-time when displaying the image in the preview window.

In one embodiment, a method for displaying a live preview image on an electronic device is disclosed. The method comprises computing a history color value and confidence value for each pixel of a sensor of a camera on the electronic device. Further, it comprises obtaining a new frame of pixels from the camera. Subsequently, for each pixel in the new frame, the method comprises: (a) determining if a pixel color is similar to a corresponding history color value and if a confidence value corresponding to the pixel is above a predetermined threshold; (b) responsive to a determination that the pixel color is not similar to the history color value and the confidence value is above the predetermined threshold, displaying the history color value on the live preview image when displaying the new frame; and (c) responsive to a determination that the pixel color is similar to the history color value or the confidence value is below the predetermined threshold, displaying the pixel color on the live preview image when displaying the new frame. Finally, it comprises calculating an updated history color value and an updated confidence value for the pixel.

In one embodiment, a computer-readable storage medium having stored thereon, computer executable instructions that, if executed by a computer system cause the computer system to perform a method for displaying a live preview image on a mobile device is disclosed. The method comprises computing a history color value and confidence value for each pixel of a sensor of a camera on the mobile device. Further, it comprises obtaining a new frame of pixels from the camera. Subsequently, for each pixel in the new frame, the method comprises: (a) determining if a pixel color is similar to a corresponding history color value and if a confidence value corresponding to the pixel is above a predetermined threshold; (b) responsive to a determination that the pixel color is not similar to the history color value and the confidence value is above the predetermined threshold, displaying the history color value on the live preview image when displaying the new frame; and (c) responsive to a determination that the pixel color is similar to the history color value or the confidence value is below the predetermined threshold, displaying the pixel color on the live preview image when displaying the new frame. Finally, it comprises calculating an updated history color value and an updated confidence value for the pixel.

In another embodiment, a system for displaying a live preview image on a mobile device is disclosed. The system comprises: a display screen, a memory, a camera and a processor. The processor is configured to: (i) maintain a history color value and confidence value for each pixel of a camera on the mobile device; (ii) obtain a new frame of pixels from the camera; and (iii) for each pixel in the new frame: (a) determine if a pixel color is similar to a corresponding history color value and if a confidence value corresponding to the pixel is above a predetermined threshold; (b) responsive to a determination that the pixel color is not similar to the history color value and the confidence value is above the predetermined threshold, display the history color value on the live preview image when the new frame is rendered; and (c) responsive to a determination that the pixel color is similar to the history color value or the confidence value is below the predetermined threshold, display the pixel color on the live preview image when the new frame is rendered; and (iv) calculate an updated history color value and an updated confidence value for the pixel.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "computing," "determining," "obtaining," "using," "updating," "capturing," or the like, refer to actions and processes (e.g., flowchart 800 of FIG. 8) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 1:
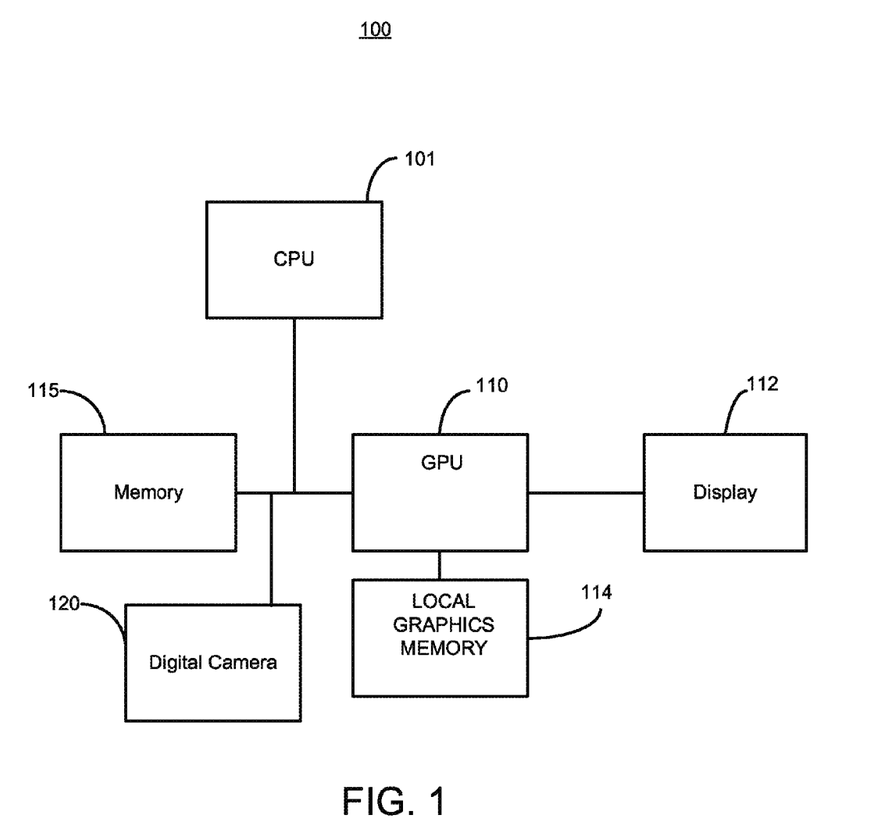
FIG. 1 shows an exemplary computer system with a digital camera used to perform long term image exposure with image stabilization in accordance with one embodiment of the present invention.

FIG. 1 shows an exemplary computer system with a digital camera used to perform long term image exposure with image stabilization in accordance with one embodiment of the present invention.

Computer system 100 depicts the components of a generic electronic or computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The computer system 100 also comprises a digital camera 120 that is used to capture images that are previewed on display 112 in accordance with embodiments of the present invention.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cell-phone, tablet computer, MP3 player, etc.), direct broadcast satellite (DBS)/terrestrial set-top box or a set-top video game console device such as, for example, the Xbox® or the PlayStation3®. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

A Method and Apparatus for Long Term Image Exposure with Image Stabilization on a Mobile Device Embodiments of the present invention provide a system and a method for a camera on a mobile device to perform foreground subtraction by allowing users to filter out undesirable elements in a live preview image on the display screen of the mobile device, e.g., objects that may unexpectedly appear for a short period of time in the field of the view of the camera.

Embodiments of the present invention can use long exposure times to build up history data for the image and maintain the history as a best approximation of the background. Subsequently, embodiments of the present invention can use the history data to infill the image where unexpected foreground objects appear in the image. Stated differently, embodiments of the present invention maintain a history of an image as the camera is previewing the image and use the history to minimize interference from unexpected objects appearing in the field of view of the camera. Embodiments of the present invention minimize interference by removing, for example, moving objects in a scene displayed in the live preview window when capturing an image via a camera application while keeping the static objects. In one embodiment, the present invention also allows users to exclude certain moving objects via selection from the removal effect.

Further, embodiments of the present invention use a visual gyroscope for performing image stabilization. The visual gyroscope can, for example, use a vision-based tracking procedure that uses the camera on the mobile device to determine orientation by identifying and tracking landmarks (or image features) in natural environment. Using the orientation and tracked features, the visual gyroscope can enable embodiments of the present invention to account for jitter by performing a best fit and creating a stable, long-exposure image.

Certain conventional mobile applications may allow the user to remove unwanted objects in an image after the image has already been captured. By comparison, embodiments of the present invention allow image effects to take place in the live preview window. For example, the undesirable objects would be filtered out in real-time when displaying the image in the preview window.

Further, conventional applications that allow removal effects to be applied to a scene in a static image after the image is captured depend on the camera posture being static. Embodiments of the present invention allow image effects to be applied in the live preview display window and also allow the camera to change position and orientation.

Figure 2:
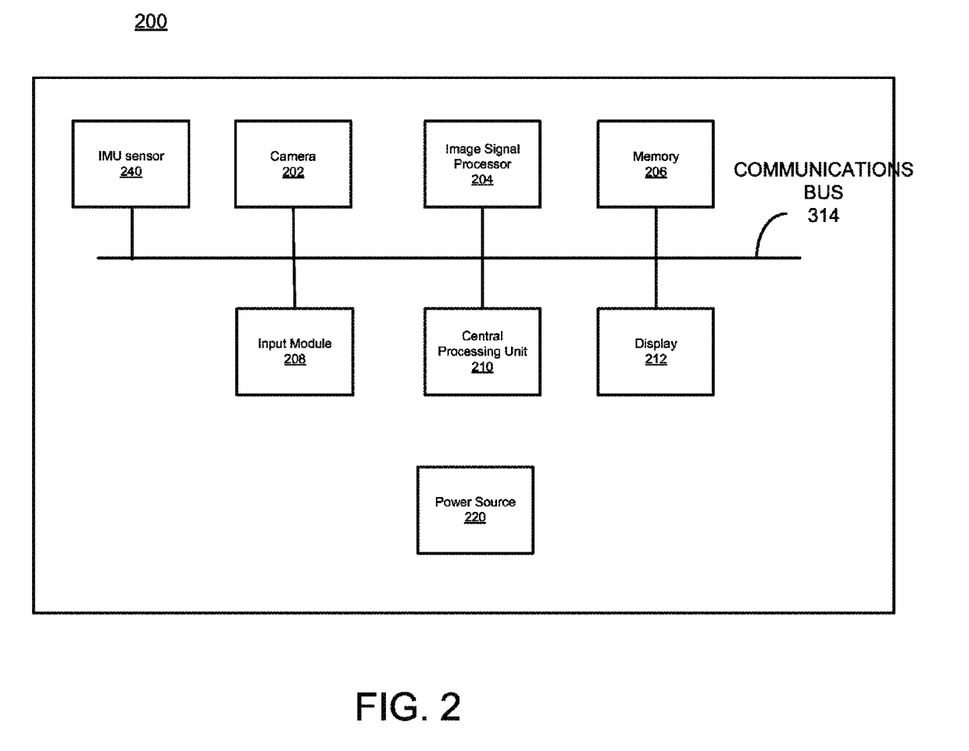
FIG. 2 shows an exemplary operating environment of a mobile device capable of performing long term image exposure with image stabilization in accordance with embodiments of the present invention.

FIG. 2 shows an exemplary operating environment of a mobile device capable of performing long term image exposure with image stabilization in accordance embodiments of the present invention.

System 200 includes camera 202, image signal processor (ISP) 204, memory 206, IMU sensor 240, input module 208, central processing unit (CPU) 210, display 212, communications bus 214, and power source 220. Power source 220 provides power to system 200 and may be a DC or AC power source. System 200 depicts the components of an exemplary system in accordance with embodiments of the present invention providing the execution platform for certain hardware-based and software-based functionality. Although specific components are disclosed in system 200, it should be appreciated that such components are examples. That is, embodiments of the present invention are well suited to having various other components or variations of the components recited in system 200. It is appreciated that the components in system 200 may operate with other components other than those presented, and that not all of the components of system 200 may be required to achieve the goals of system 200.

CPU 210 and the ISP 204 can also be integrated into a single integrated circuit die and CPU 210 and ISP 204 may share various resources, such as instruction logic, buffers, functional units and so on, or separate resources may be provided for image processing and general-purpose operations. System 200 can be implemented as, for example, a digital camera, cell phone camera, portable device (e.g., audio device, entertainment device, handheld device), webcam, video device (e.g., camcorder) or any other device with a front or back facing camera.

In one embodiment, camera 202 captures light via a front-facing or back-facing lens (depending on how the user typically holds the device), and converts the light received into a signal (e.g., digital or analog). Camera 202 may comprise any of a variety of optical sensors including, but not limited to, complementary metal-oxide-semiconductor (CMOS) or charge-coupled device (CCD) sensors. Camera 202 is coupled to communications bus 214 and may provide image data received over communications bus 214. Camera 202 may comprise functionality to determine and configure optical properties and settings including, but not limited to, focus, exposure, color or white balance, and areas of interest (e.g., via a focus motor, aperture control, etc.). In one embodiment, camera 202 may also represent a front facing and a back facing camera both of which are operable to capture images contemporaneously.

Image signal processor (ISP) 204 is coupled to communications bus 214 and processes the signal generated by camera 204, as described herein. More specifically, image signal processor 204 may process data from camera 202 for storing in memory 206. For example, image signal processor 204 may process frames of visual data captured using camera 202 to be stored within memory 206.

Input module 208 allows entry of commands into system 200 which may then, among other things, control the sampling of data by camera 202 and subsequent processing by ISP 204. Input module 208 may include, but it not limited to, navigation pads, keyboards (e.g., QWERTY), up/down buttons, touch screen controls (e.g., via display 212) and the like.

Central processing unit (CPU) 210 receives commands via input module 208 and may control a variety of operations including, but not limited to, sampling and configuration of camera 202, processing by ISP 204, and management (e.g., addition, transfer, and removal) of images and/or video from memory 206.

Inertial Measurement Unit (IMU) module 240 can detect the current rate of acceleration of the device 200 using one or more accelerometers in device 200 (not shown). Accelerometers detect acceleration forces along a single axis, three are often combined to provide acceleration detection along the x, y and z axis. When the accelerometer is at rest, the axis pointing down will read one due to the force of gravity and the two horizontal axis will read zero.

The IMU module 240 can also detect changes in rotational attributes like pitch, roll, and yaw using one or more gyroscopes in device 200 (not shown). A gyroscope detects the rotational change of a device. Finally, IMU module 240 may also receive data from a magnetometer (not shown), which is a sensor for measuring the strength and direction of magnetic fields, and can be used for tracking magnetic north, thereby, acting like a compass. Alternatively, the IMU module 240 may receive direction data from a digital compass.

Figure 3:
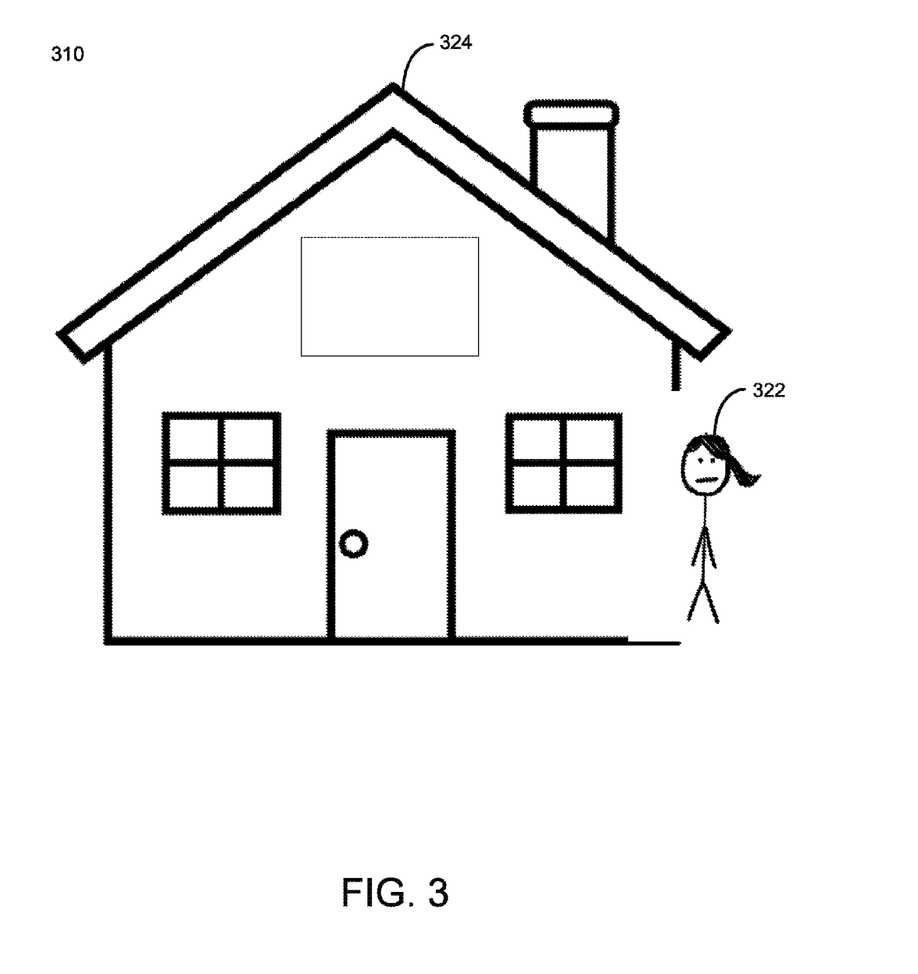
FIG. 3 illustrates an exemplary use case for the long term image exposure system in accordance with one embodiment of the present invention.

FIG. 3 illustrates an exemplary use case for the long term image exposure system in accordance with one embodiment of the present invention. The user is trying to capture an image 310 of the house 324. However, as the user is about to capture the image, a person 322 suddenly appears in the field of the view of the camera. In a conventional camera, the person would immediately appear on the preview screen of the device, e.g., a smart phone and the user would not have any opportunity to remove her or keep her from appearing in the image. Embodiments of the present invention, however, would use history data to infill the image when object 322 appears in the image, so that the live preview image appearing on the display screen would not display object 322 until some period of time had expired whereby the person 322 would become a recognized part of the history data. Instead the camera system would automatically substitute object 322 with the prior background information recorded in history.

Figure 4A:
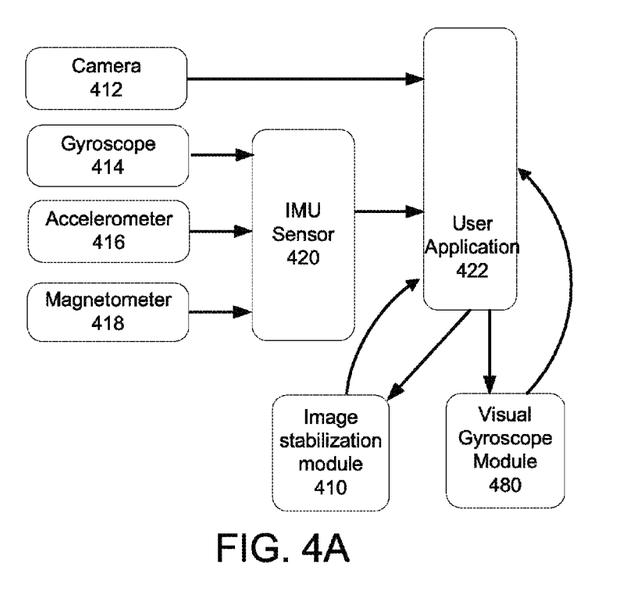
FIG. 4A is a high level block diagram illustrating the elements of the long term image exposure system proposed in accordance with embodiments of the present invention.

FIG. 4A is a high-level block diagram illustrating the elements of the long term image exposure system proposed in accordance with embodiments of the present invention. The basic approach employed in embodiments of the present invention is using long exposure times to build up a history for an image and maintaining the history as a best approximation of the background. Subsequently, embodiments of the present invention can use the history data to infill the live preview image where unexpected foreground or background objects appear in the image.

Further, embodiments of the present invention use a visual gyroscope for performing image stabilization. The visual gyroscope can, for example, use a vision-based tracking procedure that uses the camera on the mobile device to determine orientation by identifying and tracking landmarks (or image features) in natural environment. Using the orientation and tracked features, the visual gyroscope can enable embodiments of the present invention to account for jitter by performing a best fit and creating a stable, long-exposure image. One example of a visual gyroscope that can be employed in embodiments of the present invention is disclosed in related application "A METHOD AND APPARATUS FOR DEVICE ORIENTATION TRACKING USING A VISUAL GYROSCOPE," referenced above, naming Josh Abbott, Jared Heinly and Jim van Welzen as inventors, filed on Oct. 10, 2013, with Ser. No. 14/051,282. That application is incorporated herein by reference in its entirety and for all purposes.

As shown in FIG. 4, visual data from camera 412 is transmitted to user application 422. User application 422 transmits the incoming camera data to image stabilization module 410 where it is used to build a history and confidence map and to determine a similarity between each of the incoming pixels in an image and a respective pixel in history for the same image. As will be explained further below, the similarity values in conjunction with the history and confidence map are used to determine whether to use pixels from a newly captured frame, from a frame in history, or both to display a composite image on the camera. For example, if a current pixel in a new frame is not similar to the same pixel in the history frame, but the confidence level for the history frame is high, then it is a good indication that the pixel in the new or current frame has been generated as a result of an undesirable object that has moved into the filed of view of the camera. In this case, the historical value of the pixel will be used to draw the image rather than the pixel representing the object.

Further, data from the gyroscope 414, accelerometer 416 and magnetometer 418 feeds into the IMU sensor 420. The output of the IMU sensor 420 is transmitted to the user application 422. The time-stamped camera data and IMU sensor data from user application 422 is directed to the visual gyroscope module 480. The visual gyroscope module 480 uses the time-stamped camera and sensor data to create time-stamped device orientation data and to track features in the environment. The orientation and tracked features are used by the visual gyroscope module 480 to compensate for the jitter and movement of device and to create a stable composite image that can be displayed to user in the live preview window of the mobile device.

In one embodiment of the present invention, several images are captured and combined on a per-pixel basis to remove noisy objects in the final captured image displayed in a preview window of the mobile device. This happens in real-time while the user is capturing a scene so that the effect is visible in the live preview window. The combining of the pixels is performed in fragment shaders in order to create real-time user experience. As will be discussed further below, in one embodiment of the present invention, the pixel combining procedure is intelligently storing a per-pixel confidence score to determine the contribution of new values. A high score typically denotes that the current pixel color is likely the correct one.

In one embodiment of the present invention, the user is also allowed to use manual selection in order to select areas in the scene that may move, but they do not want removed from the scene. Also, in another embodiment of the present invention, visual tracking is performed by a visual gyroscope device, as disclosed above, in order to account for device movement that could map pixels to the wrong area. Further, in one embodiment, the procedure uses pixels from the new frame whenever possible because the new frame contains fewer potential flaws than the history frame. However, the history is typically used when the pixel in the new frame is dissimilar to the historical frame and the pixel has a high confidence value.

Figure 4B:
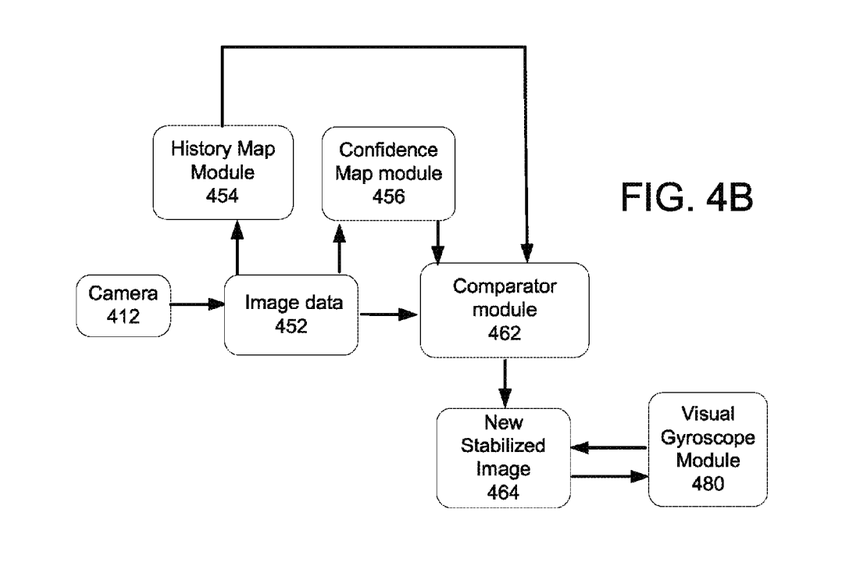
FIG. 4B is a flow diagram illustrating how the image stabilization module of FIG. 4A creates stabilized images in accordance with embodiments of the present invention.

FIG. 4B is a flow diagram illustrating how the image stabilization module of FIG. 4A creates stabilized images in accordance with embodiments of the present invention. First, image data 452 is captured by the camera module 412. The pixels of the image are compared using Comparator Module 462 to a history map from History Map module 454. If a pixel in the image data 452 is not similar to a corresponding pixel in the history map and the confidence value for that pixel is above a certain threshold, as determined using Confidence Map module 456, then a history pixel is used to represent that pixel in the New Stabilized Image 464 in the live preview display.

Also, the image data 452 is used to compute a new value for the history frame on a per pixel basis using History Map Module 454 and to update the confidence value on a per pixel basis using Confidence Map Module 456. Accordingly, history and confidence values are updated for each pixel in every new camera frame.

Finally, the Visual Gyroscope Module 480 is used, in one embodiment, to compensate for the jitter and movement of device and to create a stable composite image 464 that can be displayed to user in the live preview window of the mobile device.

Figure 5:
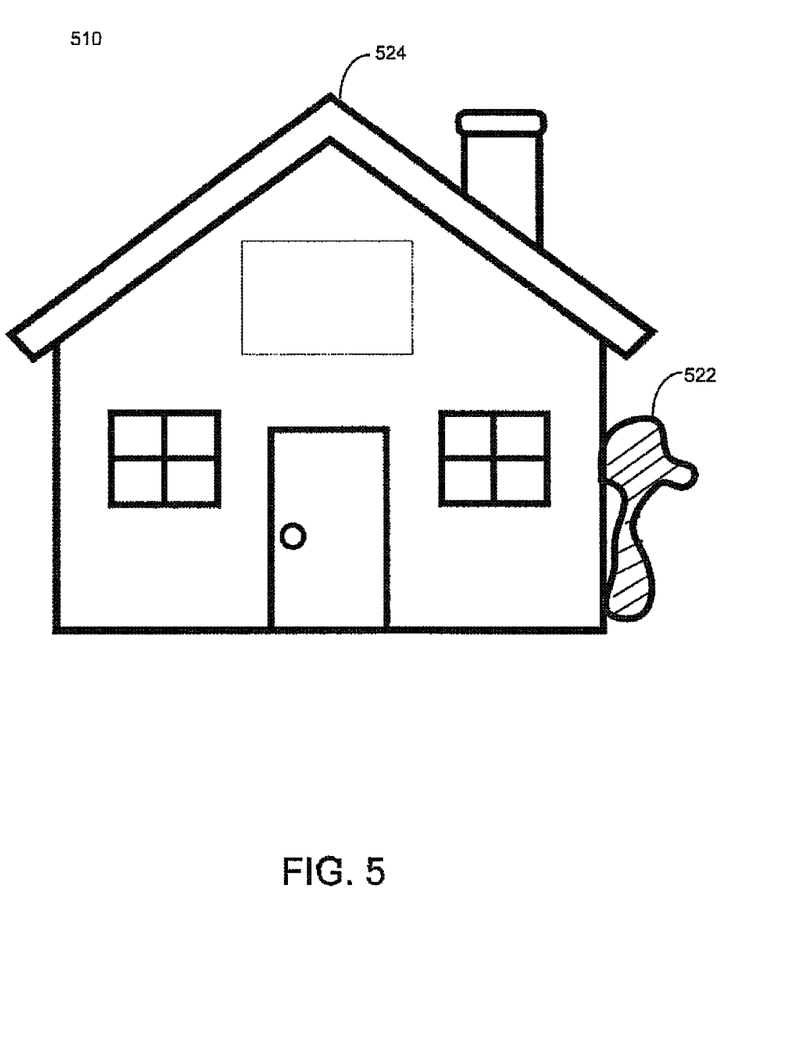
FIG. 5 is an illustration of masking out unwanted pixels in an image in accordance with an embodiment of the present invention.

FIG. 5 is an illustration of masking out unwanted pixels in an image in accordance with an embodiment of the present invention. In the example of FIG. 3, the unwanted pixels from object 322 need to be masked out and replaced by pixels in history. Thus a mask 522 is created wherein pixels in the current frame 510 that are dissimilar to the pixels in history and have high confidence values are substituted with pixels from the history. Accordingly, object 322 is masked out using mask 522 and replaced with pixels from history that represent a clear background without the person represented by object 322.

Over time, nevertheless, if object 322 continues to remain in image 510, then the history continues to build up to include object 322 in the scene. The confidence value of the pixels constituting object 322 in the image continues to increase. Thus, object 322 will eventually re-appear into the live preview image on the display screen of the mobile device.

Figure 6:
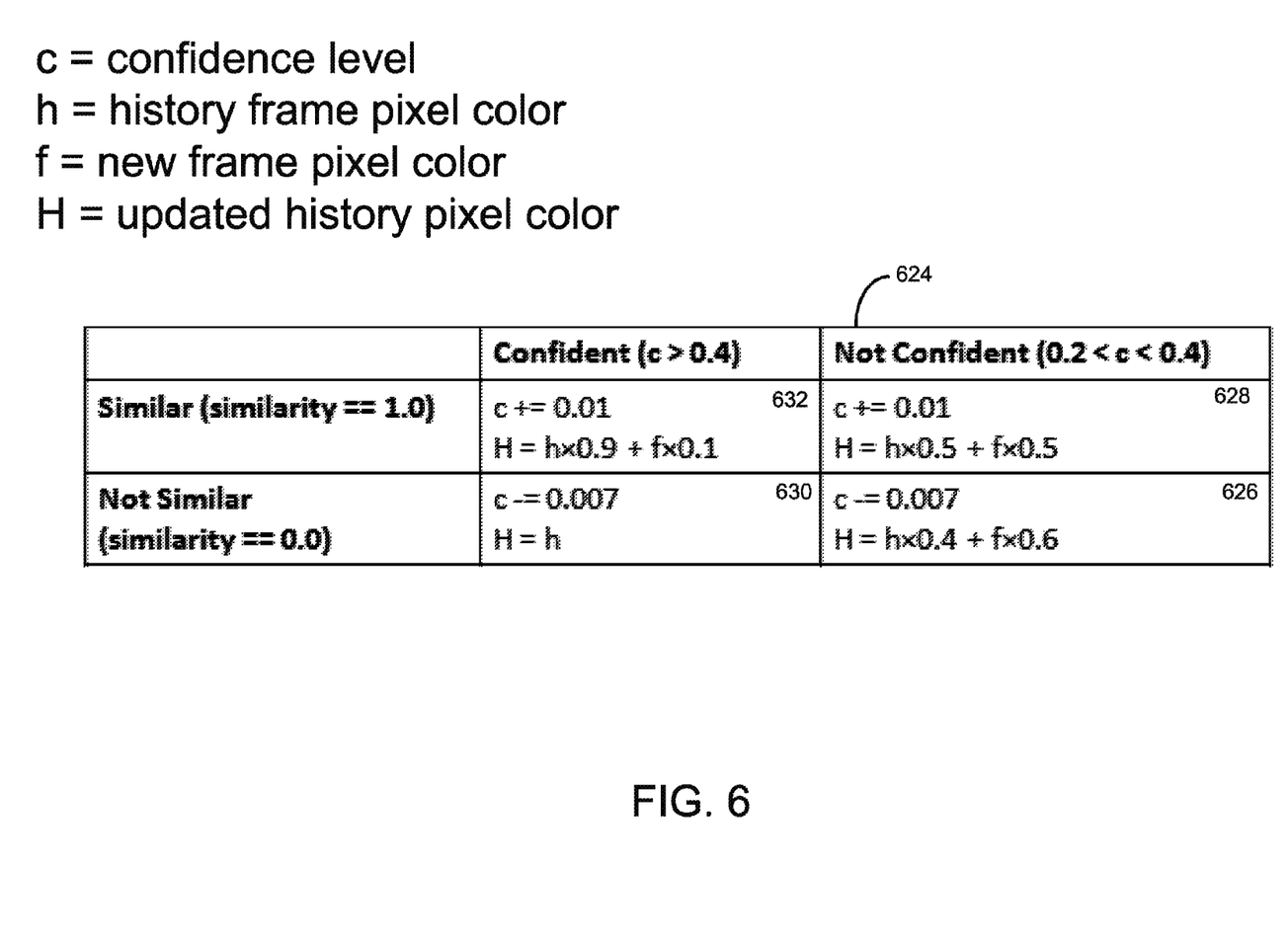
FIG. 6 is a table illustrating how the history for an image is updated based on pixel confidence and similarity in accordance with an embodiment of the present invention.

FIG. 6 is a table illustrating how the history for an image is updated based on pixel confidence and similarity in accordance with an embodiment of the present invention. As shown in FIG. 6, for each pixel, the procedure of the present invention keeps track of the confidence level ("c"), the history frame pixel color ("h"), the new frame pixel color ("f"), and the updated history pixel color ("H"). When the mobile device is first initiated, a confidence and history map are built up for each pixel in a frame. The confidence and history map are built up in accordance with the procedure illustrated in table 624. It is the confidence map in conjunction with the history map and similarity values that determine whether pixels appearing on the screen are from a current frame or history frame.

As discussed in reference to FIG. 4B, history values are updated, in one embodiment, for every new camera frame. In one embodiment, the confidence values for each pixel can be stored in the alpha channel of the history texture. Further, in one embodiment, the similarity values can be stored in the similarity texture after similarity computation and blurring.

When a pixel in the new frame ("f") is determined to have a similar color to the pixel in the history frame ("h") and the confidence level for that pixel is over a predetermined threshold, e.g., 0.4, the updated history pixel color ("H") can be a blend of the history frame pixel color and the new frame pixel color, but weighted heavily in favor of the historical pixel color ("h"). For example, as shown in quadrant 632 of Table 624, the updated history pixel color, H, can be updated in accordance with the following formula:

$$H = h \times 0.9 + f \times 0.1 \qquad (1)$$

Further, the because the historical pixel ("h") is similar to the new frame pixel ("f"), the confidence value for that pixel can be increased. In the example shown in Table 624, the confidence value is increased by 0.01.

If the pixel color in the new frame ("f") is similar to the pixel in the history frame ("h") but the confidence level is below the predetermined threshold, then the updated history pixel color can be an equal blend of the history frame color ("h") and the new frame ("f"). For example, as shown in quadrant 628 of Table 624, the updated history pixel color, H, can be updated in accordance with the following formula:

$$H = h \times 0.5 + f \times 0.5 \qquad (2)$$

Similar to the prior case, because the historical pixel ("h") is similar to the new frame pixel ("f"), the confidence value for that pixel can be increased. In the example shown in Table 624, the confidence value is increased by 0.01.

When a pixel in the new frame ("f") is determined to not have a similar color to the pixel in the history frame ("h") and the confidence level for that pixel is over a predetermined threshold, e.g., 0.4, the updated history pixel color ("H") can be set to be equivalent to the historical pixel color ("h") because the degree of confidence in the historical pixel color ("h") is high as shown in quadrant 630. However, because the new frame pixel color ("f") is different from the historical pixel color ("h"), the confidence value is decreased slightly. In the example shown in Table 624 the confidence value is decreased by 0.007.

Finally, when a pixel in the new frame ("f") is determined to not have a similar color to the pixel in the history frame ("h") and the confidence level for that pixel is under a predetermined threshold, e.g., 0.4, the updated history pixel color ("H") is set to be blend of the history frame pixel color and the new frame pixel color, but weighted more heavily in favor of the new frame color ("f"). For example, as shown in quadrant 626 of Table 624, the updated history pixel color, H, can be updated in accordance with the following formula:

$$H = h \times 0.4 + f \times 0.6 \qquad (3)$$

This is because the pixel has a low confidence value, which means that it is not very confident in the historical pixel value. Thus, the updated history is set to be weighted heavier in favor of the new frame pixel color ("f"). Further, the confidence value is decreased because the historical pixel color ("h") is dissimilar to the new pixel color ("f"). In the example shown in Table 624 the confidence value is decreased by 0.007.

This decreasing of the confidence value in view of new dissimilar pixels allows the unwanted pixels that are masked out at first to eventually appear on the display screen of the mobile device as new historical values build up if the unwanted object remains in the camera's filed of view. Using the example from FIG. 5, if the unwanted object 322 stays in the field of view of the camera, and assuming that the pixels from unwanted object 322 are dissimilar to the real backdrop of the scene, eventually the confidence value will drop to a point that new frame pixel colors ("f") will be used to build up the history as shown in quadrant 626 of Table 624. If the unwanted object remains in the field of view of the camera, the historical pixel values begin to converge towards the new frame pixel colors. The new frame pixel colors ("f") will eventually be determined to be similar to the history frame pixel colors ("h") and the confidence will start to increase as shown in quadrant 628.

In one embodiment of the present invention, the similarity between the new frame pixel colors and the history pixel colors is determined based on Euclidean distance between both pixels, wherein the pixels are treated as 3-dimensional vectors and a threshold value is set for the similarity determination. In one embodiment, some post-processing techniques, e.g., erosion, dilation etc. can be used to reduce the effects of noise and jitter before the similarity and confidence values are used to decide between the new frame and the historical frame for image display purposes.

As stated above, the similarity and confidence values can now be used to make a decision whether to display pixels from a new frame or the history frame in the composite image. Newer frames typically contain fewer potential flaws than the history frame, thus, in one embodiment, the new frame is used whenever possible. However, the historical pixel color is displayed when the history pixel is confident and the new frame is dissimilar, e.g., when the pixel is in quadrant 630 of Table 624. Thus, a final composite image is created by deciding on a per-pixel basis whether to use a pixel color from a new frame or a history frame.

Finally, in one embodiment, the visual gyroscope, as discussed above, is used to handle issues related to jitter and movement of the device. The visual gyroscope is used to estimate rotation of the device by the user. The rotated new frame is compared to the frame in history and the visual gyroscope allows the mobile device to compensate for the rotation by rotating the new frame back in the opposite direction. It is important to note that the visual gyroscope allows pixels corresponding to the same point in the scene to be compared, not just pixels with the same image coordinates.

Figure 7:
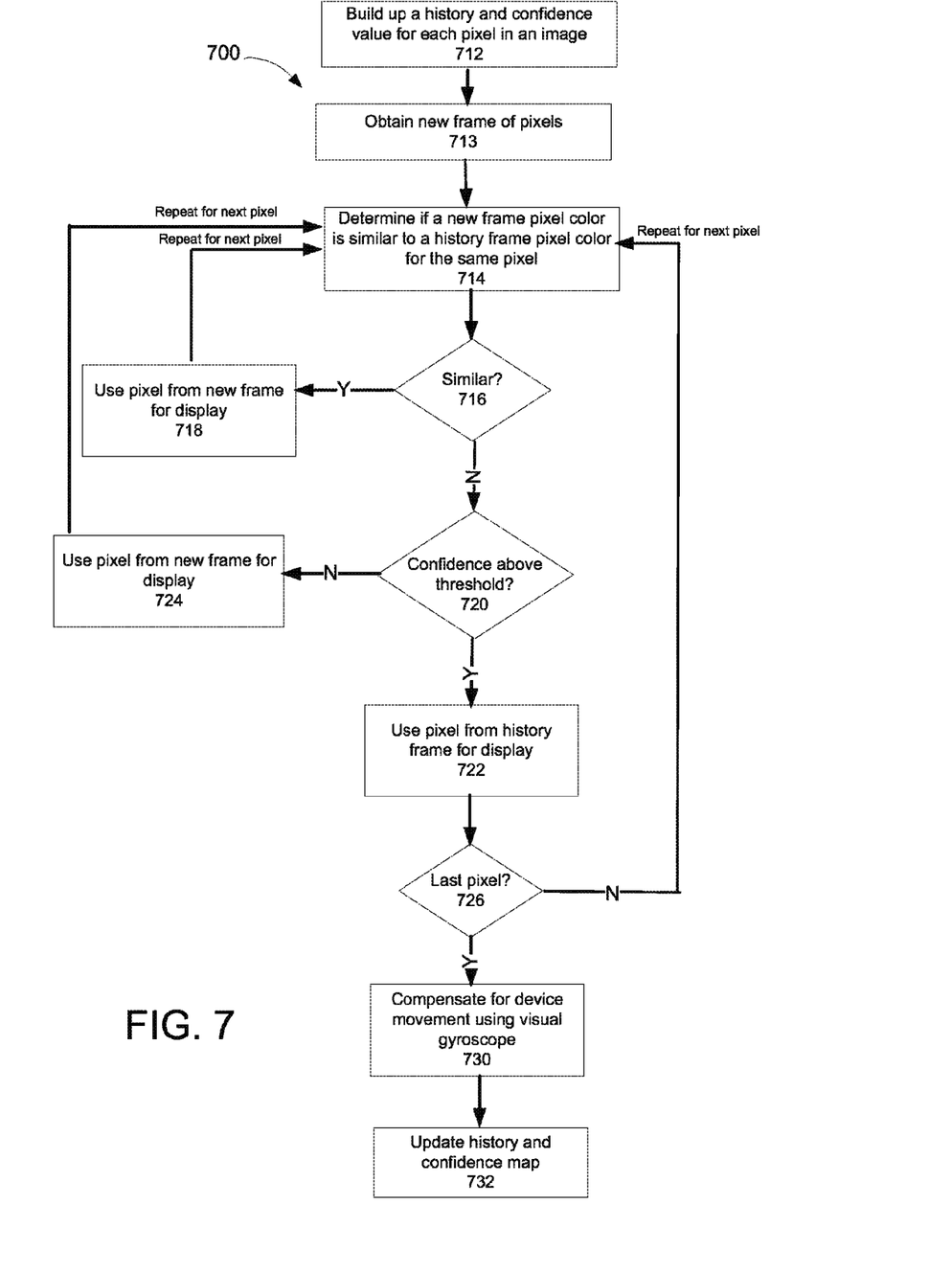
FIG. 7 depicts a flowchart of an exemplary computer implemented process of displaying a live preview image with long term exposure on a mobile device in accordance with one embodiment of the present invention.

FIG. 7 depicts a flowchart of an exemplary computer implemented process of displaying a live preview image with long term exposure on a mobile device in accordance with one embodiment of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 7 should not be construed as limiting the scope of the invention. Rather, it will be apparent to persons skilled in the relevant art(s) from the teachings provided herein that other functional flows are within the scope and spirit of the present invention. Flowchart 700 may be described with continued reference to exemplary embodiments described above, though the method is not limited to those embodiments.

At step 712, a history and confidence value is built up for each pixel in an image captured by a camera displayed on the live preview window of a mobile device. Subsequently, at step 713 a new frame of pixels is obtained.

At step 714, a new frame pixel color for one of the pixels in the new frame is compared to the history frame pixel color to determine if they are similar. If at step 716, it is determined they are similar, then at step 718, the pixel from the new frame is used for display on the live preview image on the device and the process is repeated for the next pixel in the image.

If the pixel color is not similar to the history frame pixel color, then at step 720, the confidence level is checked to if it above a certain threshold, e.g., 0.4 as described above. If it not above the threshold value, then the pixel from the new frame is used for display at step 724 and the process is repeated for the next pixel in the image. If, however, the confidence value is greater than the threshold, then the history frame pixel color is used for display at step 722.

The procedure, at step 726, checks to determine if that was the last pixel in the image. If not, the process is repeated for the next pixel in the image. If it was the last pixel, then at step 730 the visual gyroscope is used to estimate rotation and compensate for device movement by rotating the new frame to fit the prior frame.

Finally, at step 732, the history and confidence map is updated using information from the new frame.

Figure 8:
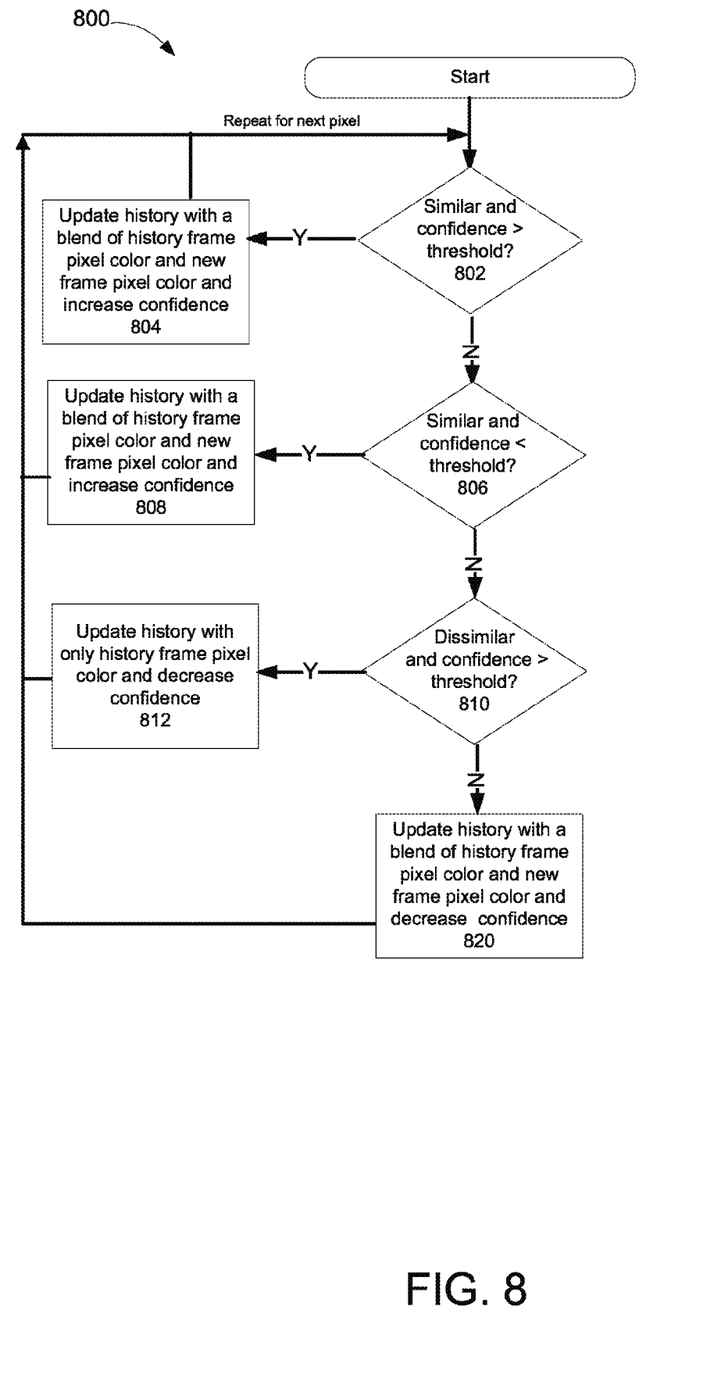
FIG. 8 depicts a flowchart of an exemplary computer implemented process of updating a history and confidence map in accordance with one embodiment of the present invention.

FIG. 8 depicts a flowchart of an exemplary computer implemented process of updating a history and confidence map in accordance with one embodiment of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 8 should not be construed as limiting the scope of the invention. Rather, it will be apparent to persons skilled in the relevant art(s) from the teachings provided herein that other functional flows are within the scope and spirit of the present invention. Flowchart 800 may be described with continued reference to exemplary embodiments described above, though the method is not limited to those embodiments.

As discussed in reference to FIG. 7, a history and confidence value is built for each pixel in an image and is updated continuously. For every pixel in an image, the procedure first determines at step 802 if the confidence value for the pixel is above a predetermined threshold and if the pixel in the incoming new frame is similar in color to a history frame pixel color. If the conditions are met, then at step 804 the updated history pixel color is set to be a blend of the history frame pixel color and the new frame pixel color and the confidence value is increased. For example, as shown in quadrant 632 of Table 624, the updated history pixel color, H, can be updated in accordance with formula (1) discussed above. Subsequently, the process is repeated for the other pixels in the image.

In one embodiment, a new frame pixel color is determined to be similar to a history frame pixel color if it is above a similarity threshold value, wherein the similarity threshold is based on a Euclidian distance between two pixels.

If either of the two conditions are not met, then at step 806, the procedure determines if the confidence value for the pixel is below the predetermined threshold and if the pixel in the incoming new frame is similar in color to a history frame pixel color. If those conditions are met, then at step 808 the updated history pixel color is set to be a blend of the history frame pixel color and the new frame pixel color and the confidence value is increased. For example, as shown in quadrant 628 of Table 624, the updated history pixel color, H, can be updated in accordance with formula (2) discussed above. Subsequently, the process is repeated for the other pixels in the image.

If the conditions of step 806 are not met, then at step 810, the procedure determines if the confidence value for the pixel is above the predetermined threshold and if the pixel in the incoming new frame is not similar in color to a history frame pixel color. If the conditions of step 810 are met, then at step 812 the updated history pixel color is set to the value of the history frame pixel color and the confidence value is decreased. Subsequently, the process is repeated for the other pixels in the image.

If the conditions of step 810 are not met, then the updated history pixel color is set to be a blend of the history frame pixel color and the new frame pixel color and the confidence value is decreased. For example, as shown in quadrant 626 of Table 624, the updated history pixel color, H, can be updated in accordance with formula 3 discussed above. Subsequently, the process is repeated for the other pixels in the image.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for displaying a live preview image on an electronic device, said method comprising:
   computing a history color value and confidence value for each pixel of a sensor of a camera on said electronic device;
   accessing a new frame of pixels from said camera; and
   for each pixel in said new frame:
   determining if a pixel color is similar to said history color value corresponding to said pixel and if said confidence value corresponding to said pixel is above a predetermined threshold;
   responsive to a determination that said pixel color is not similar to said history color value and said confidence value is above said predetermined threshold, displaying said history color value on said live preview image when displaying said new frame; and
   responsive to a determination that said pixel color is similar to said history color value or said confidence value is below said predetermined threshold, displaying said pixel color on said live preview image when displaying said new frame.

2. The method of claim 1, further comprising:
   calculating an updated history color value and an updated confidence value for said pixel; and
   compensating for movement of said electronic device using a visual gyroscope to match pixels in said new frame to corresponding pixels in prior frames.

3. The method of claim 2, wherein said calculating further comprises:

responsive to a determination that said pixel color is similar to said history color value and said confidence value is above said predetermined threshold, setting an updated history pixel color to equal a first blend of said history color value and increasing said confidence value, wherein said first blend is weighted towards said history color value.

4. The method of claim 3, wherein said calculating further comprises:
responsive to a determination that said pixel color is similar to said history color value and said confidence value is below said predetermined threshold, setting said updated history pixel color to equal a second blend of said history color value and increasing said confidence value, wherein said second blend is weighted equally between said history color value and said pixel color.

5. The method of claim 4, wherein said calculating further comprises:
responsive to a determination that said pixel color is not similar to said history color value and said confidence value is above said predetermined threshold, setting said updated history pixel color to equal said history color value and decreasing said confidence value.

6. The method of claim 5, wherein said calculating further comprises:
responsive to a determination that said pixel color is not similar to said history color value and said confidence value is below said predetermined threshold, setting said updated history pixel color to equal a third blend of said history color value and decreasing said confidence value, wherein said third blend is weighted towards said pixel color.

7. The method of claim 1, wherein a pixel in said new frame is determined to be similar to said corresponding history color value if a similarity threshold is met, wherein said similarity threshold is based on a Euclidian distance between two pixels.

8. A non-transitory computer-readable storage medium having stored thereon, computer executable instructions that, if executed by a computer system cause the computer system to perform a method for displaying a live preview image on a mobile device, said method comprising:
computing a history color value and confidence value for each pixel of a sensor of a camera on said mobile device;
accessing a new frame of pixels from said camera; and
for each pixel in said new frame:
determining if a pixel color is similar to said history color value corresponding to said pixel and if said confidence value corresponding to said pixel is above a predetermined threshold;
responsive to a determination that said pixel color is not similar to said history color value and said confidence value is above said predetermined threshold, displaying said history color value on said live preview image when displaying said new frame; and
responsive to a determination that said pixel color is similar to said history color value or said confidence value is below said predetermined threshold, displaying said pixel color on said live preview image when displaying said new frame.

9. The computer-readable medium as described in claim 8, wherein said method further comprises:
calculating an updated history color value and an updated confidence value for said pixel; and
compensating for movement of said mobile device using a visual gyroscope to match pixels in said new frame to corresponding pixels in prior frames.

10. The computer-readable medium as described in claim 9, wherein said calculating further comprises:
responsive to a determination that said pixel color is similar to said history color value and said confidence value is above said predetermined threshold, setting an updated history pixel color to equal a first blend of said history color value and increasing said confidence value, wherein said first blend is weighted towards said history color value.

11. The computer-readable medium as described in claim 10, wherein said calculating further comprises:
responsive to a determination that said pixel color is similar to said history color value and said confidence value is below said predetermined threshold, setting said updated history pixel color to equal a second blend of said history color value and increasing said confidence value, wherein said second blend is weighted equally between said history color value and said pixel color.

12. The computer-readable medium as described in claim 11, wherein said calculating further comprises:
responsive to a determination that said pixel color is not similar to said history color value and said confidence value is above said predetermined threshold, setting said updated history pixel color to equal said history color value and decreasing said confidence value.

13. The computer-readable medium as described in claim 12, wherein said calculating further comprises:
responsive to a determination that said pixel color is not similar to said history color value and said confidence value is below said predetermined threshold, setting said updated history pixel color to equal a third blend of said history color value and decreasing said confidence value, wherein said third blend is weighted towards said pixel color.

14. The computer-readable medium as described in claim 8, wherein a pixel in said new frame is determined to be similar to said corresponding history color value if a similarity threshold is met, wherein said similarity threshold is based on a Euclidian distance between two pixels.

15. A system for displaying a live preview image on a mobile device, said system comprising:
a display screen;
a memory;
a camera; and
a processor configured to:
maintain a history color value and confidence value for each pixel of a camera on said mobile device;
access a new frame of pixels from said camera; and
for each pixel in said new frame:
determine if a pixel color is similar to said history color value corresponding to said pixel and if a confidence value corresponding to said pixel is above a predetermined threshold;
responsive to a determination that said pixel color is not similar to said history color value and said confidence value is above said predetermined threshold, display said history color value on said live preview image when said new frame is rendered; and
responsive to a determination that said pixel color is similar to said history color value or said confidence value is below said predetermined threshold, display said pixel color on said live preview image when said new frame is rendered.

16. The system of claim 15, wherein said processor is further configured to:
calculate an updated history color value and an updated confidence value for said pixel; and
compensate for movement of said mobile device using a visual gyroscope to match pixels in said new frame to corresponding pixels in prior frames.

17. The system of claim 16, wherein in order to calculate said updated history color value and said updated confidence value, said processor is further configured to:
responsive to a determination that said pixel color is similar to said history color value and said confidence value is above said predetermined threshold, set an updated history pixel color to equal a first blend of said history color value and increasing said confidence value, wherein said first blend is weighted towards said history color value.

18. The system of claim 17, wherein in order to calculate said updated history color value and said updated confidence value, said processor is further configured to:
responsive to a determination that said pixel color is similar to said history color value and said confidence value is below said predetermined threshold, set said updated history pixel color to equal a second blend of said history color value and increasing said confidence value, wherein said second blend is weighted equally between said history color value and said pixel color.

19. The system of claim 18, wherein in order to calculate said updated history color value and said updated confidence value, said processor is further configured to:
responsive to a determination that said pixel color is not similar to said history color value and said confidence value is above said predetermined threshold, set said updated history pixel color to equal said history color value and decreasing said confidence value.

20. The system of claim 19, wherein in order to calculate said updated history color value and said updated confidence value, said processor is further configured to:
responsive to a determination that said pixel color is not similar to said history color value and said confidence value is below said predetermined threshold, set said updated history pixel color to equal a third blend of said history color value and decreasing said confidence value, wherein said third blend is weighted towards said pixel color.

\* \* \* \* \*